United States Patent
Tiemann

(10) Patent No.: US 10,942,312 B1
(45) Date of Patent: Mar. 9, 2021

(54) OPTICAL TEMPERATURE SENSING METHODS AND DEVICES ASSOCIATED WITH PHOTONIC INTEGRATED CIRCUITS

(71) Applicant: LOCKHEED MARTIN CORPORATION, Bethesda, MD (US)

(72) Inventor: Bruce Gregory Tiemann, Longmont, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/367,088

(22) Filed: Mar. 27, 2019

Related U.S. Application Data

(60) Provisional application No. 62/650,210, filed on Mar. 29, 2018.

(51) Int. Cl.
G02B 6/293 (2006.01)
G02B 6/12 (2006.01)

(52) U.S. Cl.
CPC ....... *G02B 6/2935* (2013.01); *G02B 6/29352* (2013.01); *G02B 2006/12138* (2013.01)

(58) Field of Classification Search
CPC .............. G02B 6/2935; G02B 6/29352; G02B 2006/12138
USPC .................................................. 385/3, 12, 14
See application file for complete search history.

(56) References Cited

U.S. PATENT DOCUMENTS

| | | | | |
|---|---|---|---|---|
| 4,515,430 A | * | 5/1985 | Johnson | G01N 21/45 356/477 |
| 4,714,342 A | * | 12/1987 | Jackson | G01K 11/32 356/44 |
| 4,756,627 A | * | 7/1988 | Nelson | G01K 5/52 374/159 |
| 5,289,256 A | * | 2/1994 | Gramling | G01B 11/161 250/227.19 |
| 5,322,361 A | * | 6/1994 | Cabib | G01K 5/52 356/43 |
| 5,611,007 A | * | 3/1997 | Wolf | G02B 6/12007 385/11 |
| 5,691,921 A | * | 11/1997 | Berlin | B65H 7/02 702/99 |
| 6,123,675 A | * | 9/2000 | Kreizman | G01K 3/14 374/100 |
| 6,314,228 B1 | * | 11/2001 | Korenaga | G01K 5/62 374/E11.015 |

(Continued)

OTHER PUBLICATIONS

"Temperature gradient sensor based on a long-fiber Bragg grating and time-frequency analysis" by Ricchiuti et al, Optics Letters, vol. 39, No. 19, pp. 5729-5731, 2014.*

(Continued)

*Primary Examiner* — Robert Tavlykaev
(74) *Attorney, Agent, or Firm* — Morgan, Lewis & Bockius LLP

(57) ABSTRACT

A photonic integrated circuit (PIC) with embedded optical temperature sensing includes an optical interferometer containing a first arm and a second arm, and one or more optical waveguide sections configured to measure an internal temperature of the PIC. The one or more optical waveguide sections are implemented as one or more sections of the first arm and the second arm. The first arm and the second arm have a first optical path length (OPL) and a second OPL and are made of a first material and a second material, respectively.

20 Claims, 5 Drawing Sheets

(56) References Cited

U.S. PATENT DOCUMENTS

| | | | | |
|---|---|---|---|---|
| 7,164,812 | B2* | 1/2007 | Depeursinge | A61B 5/1455 385/12 |
| 2002/0176647 | A1* | 11/2002 | Spirin | G01D 5/35303 385/12 |
| 2003/0095263 | A1* | 5/2003 | Varshneya | A61B 5/113 356/477 |
| 2006/0034558 | A1* | 2/2006 | Vidal | G01L 1/246 385/12 |
| 2008/0181554 | A1* | 7/2008 | Taverner | G01K 11/32 385/12 |
| 2009/0269002 | A1* | 10/2009 | Wong | G01L 1/246 385/12 |
| 2010/0014802 | A1* | 1/2010 | Chapman | G02B 6/125 385/11 |
| 2010/0165351 | A1* | 7/2010 | Xu | G01N 21/7703 356/477 |
| 2012/0057614 | A1* | 3/2012 | Normann | G01K 3/14 374/112 |

OTHER PUBLICATIONS

"Compensation of linear sources of non-reciprocity in Sagnac interferometers" by Frigo, Proceedings of SPIE 0412, Fiber Optic and Laser Sensors I, pp. 268-271, 1983.*

* cited by examiner

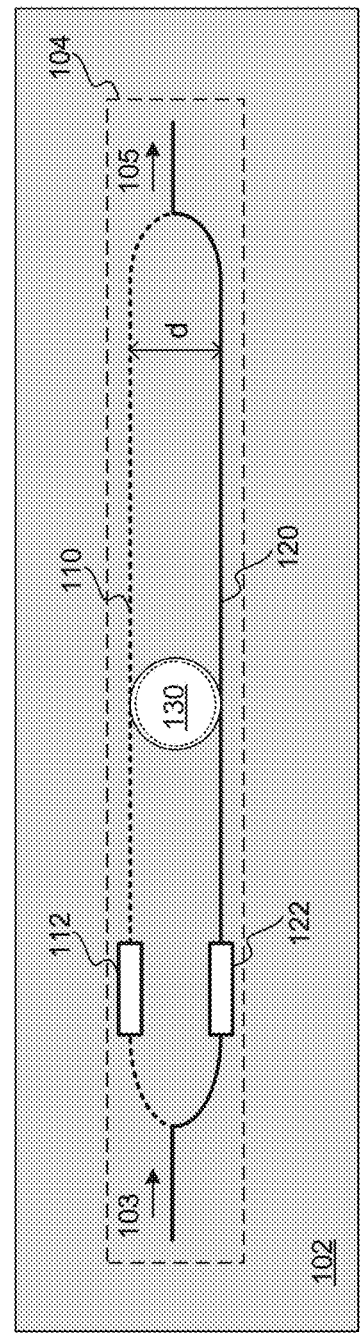
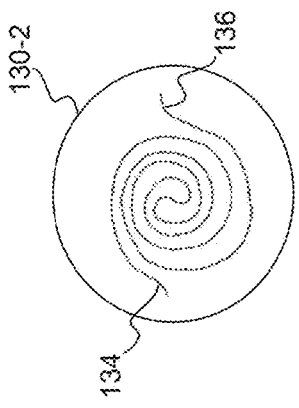
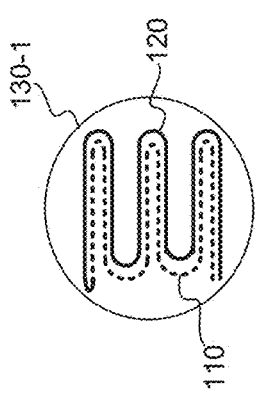
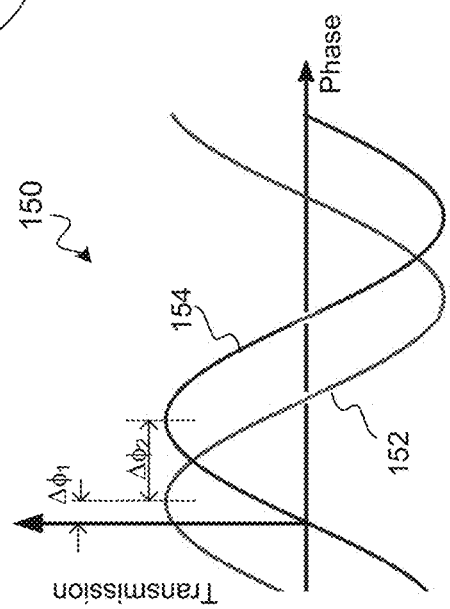
FIG. 1A
FIG. 1B
FIG. 1C
FIG. 1D

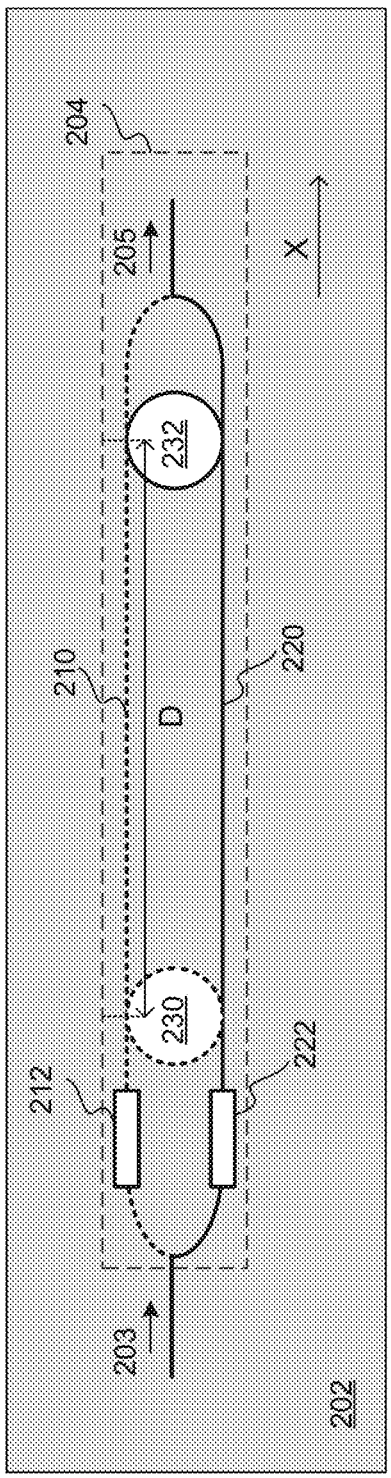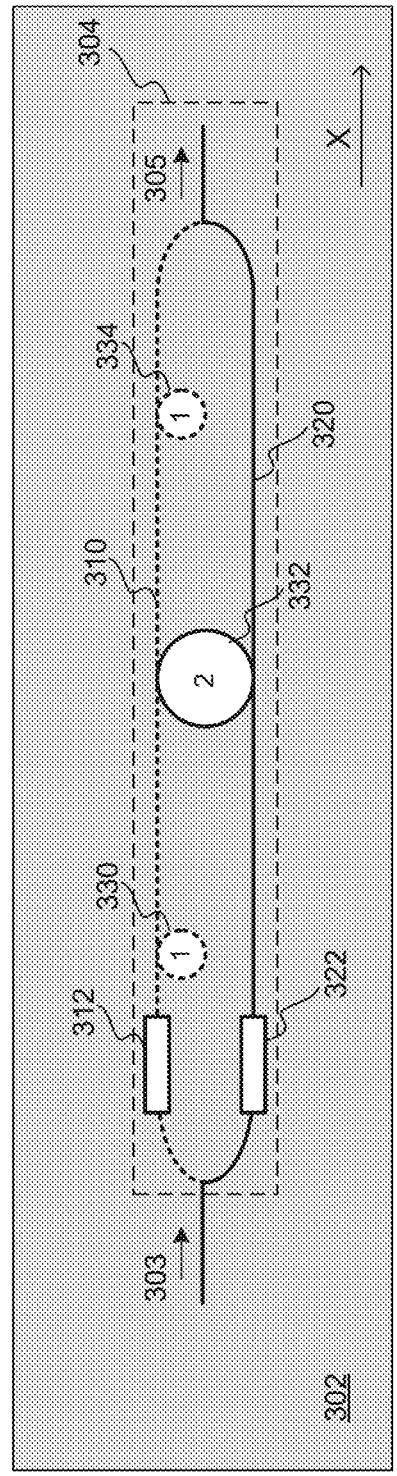
FIG. 2
FIG. 3

OPTICAL TEMPERATURE SENSING METHODS AND DEVICES ASSOCIATED WITH PHOTONIC INTEGRATED CIRCUITS

CROSS-REFERENCE TO RELATED APPLICATIONS

This application claims the benefit of priority under 35 U.S.C. § 119 from U.S. Provisional Patent Application 62/650,210 filed Mar. 29, 2018, which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to photonic integrated circuits (PICs), and more particularly to optical temperature sensing methods and devices associated with PICs.

BACKGROUND

Tunable lasers can produce outputs over a range of wavelengths, and even lasers which aren't deliberately tunable can typically have their operating output frequencies altered, at least over a small range. The output frequency alteration (e.g., tunability) can occur, for example, by varying the optical or electrical power provided to the laser gain medium, or by altering the temperature of the gain medium. With this tunability comes uncertainty, an uncertainty which may not be desirable in many applications. Oftentimes the exact operating wavelength is important, for instance, to hit a certain absorption, transmission window, or atomic transition wavelength.

Accordingly, laser wavelength meters exist that can accept a portion of a laser's output beam to measure the wavelength of that beam with sufficient accuracy and precision to determine whether the wavelength is correct or needs adjustment. These wavelength meters may come in a variety of sizes and performance levels. It is understood that accuracy, precision, and measurement speed may be the major performance parameters. PIC-based devices can be used to make mission-enabling wavemeters at lower space, weight and power (SWaP) than existing wavemeters. Existing wavemeters may use a reference laser to calibrate the wavemeter to ensure wavelength accuracy.

It is understood that in a PIC wavemeter, the only significant driver of inaccuracy is the temperature uncertainty in the PIC. In certain circumstances, a particular optical property such as the operating wavelength of a laser or the relative path length difference of an interferometer is highly temperature dependent, necessitating the use of some kind of temperature measurement and/or control on the PIC. A conventional method of measuring temperature is to bond a thermistor onto the PIC, and thereby measure the temperature at the location of the thermistor. The thermistor, however, may not necessarily be located where the sensitivity to temperature is the highest. An accurate temperature measurement alone could potentially dispense with the need for a calibration laser, thereby reducing SWaP and system complexity.

SUMMARY

According to various aspects of the subject technology, methods and configuration are disclosed for providing an all-optical temperature-measurement strategy that allows a temperature sensor to be co-located at a location of interest within the photonic integrated circuit (PIC). The disclosed solution enables measuring temperature and/or temperature gradients inside the PIC, for example, based on similar interferometers as are used for the wavelength measurement. The subject technology is general and can be used to measure temperature of any PIC; it is not limited only to wavemeters.

In one or more aspects, a photonic integrated circuit (PIC) with embedded optical temperature sensing includes an optical interferometer containing a first arm and a second arm, and one or more long waveguide sections configured to measure an internal temperature of the PIC. The one or more long waveguide sections are implemented as one or more sections of the first arm and the second arm. The first arm and the second arm have a first optical path length (OPL) and a second OPL and are made of a first material and a second material, respectively.

In other aspects, an interferometric temperature-measurement apparatus includes an optical interferometer containing a first arm and a second arm implemented on a PIC. In one or more embodiments, at least one phase modulator is implemented on at least one arm. A first phase modulator (PM) and a second PM are implemented on the first arm and the second arm, respectively, to change optical phase difference ($\Delta\phi$) between the first arm and the second arm. One or more "long" sections are implemented on the optical interferometer, with the length being sufficient to result in a measurable optical phase change when influenced by temperatures or temperature differences of interest. The first arm and the second arm have a first OPL and a second OPL and are made of a first material and a second material, respectively.

In yet other aspects, a method of measuring temperature of a PIC using an optical interferometer includes sweeping phase modulators of the optical interferometer to generate transmission fringes. The method further includes measuring multiple fringe-phase values at multiple predetermined-temperature values. A calibration record is created by using the measured multiple fringe-phase values and the multiple predetermined-temperature values. A fringe-phase value is measured at an unspecified temperature, and a value is attributed to the unspecified temperature based on the measured fringe-phase value and the calibration record.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein:

FIG. 1A is a conceptual diagram illustrating an example of a photonic integrated circuit (PIC) embedded all-optical temperature-measurement apparatus, according to certain aspects of the disclosure.

FIG. 1B is a conceptual diagram illustrating an example of a long section in a PIC embedded all-optical temperature-measurement apparatus, according to certain aspects of the disclosure.

FIG. 1C is a conceptual diagram illustrating an example of a long section in a PIC embedded all-optical temperature-measurement apparatus, according to certain aspects of the disclosure.

FIG. 1D is a chart illustrating example plots of transmission intensity fringes corresponding to a PIC embedded all-optical temperature-measurement apparatus, according to certain aspects of the disclosure.

FIG. 2 is a conceptual diagram illustrating an example of a PIC-embedded all-optical linear temperature-gradient measurement apparatus, according to certain aspects of the disclosure.

FIG. 3 is a conceptual diagram illustrating an example of a PIC-embedded all-optical nonlinear temperature-gradient measurement apparatus, according to certain aspects of the disclosure.

DETAILED DESCRIPTION

Figure 4:
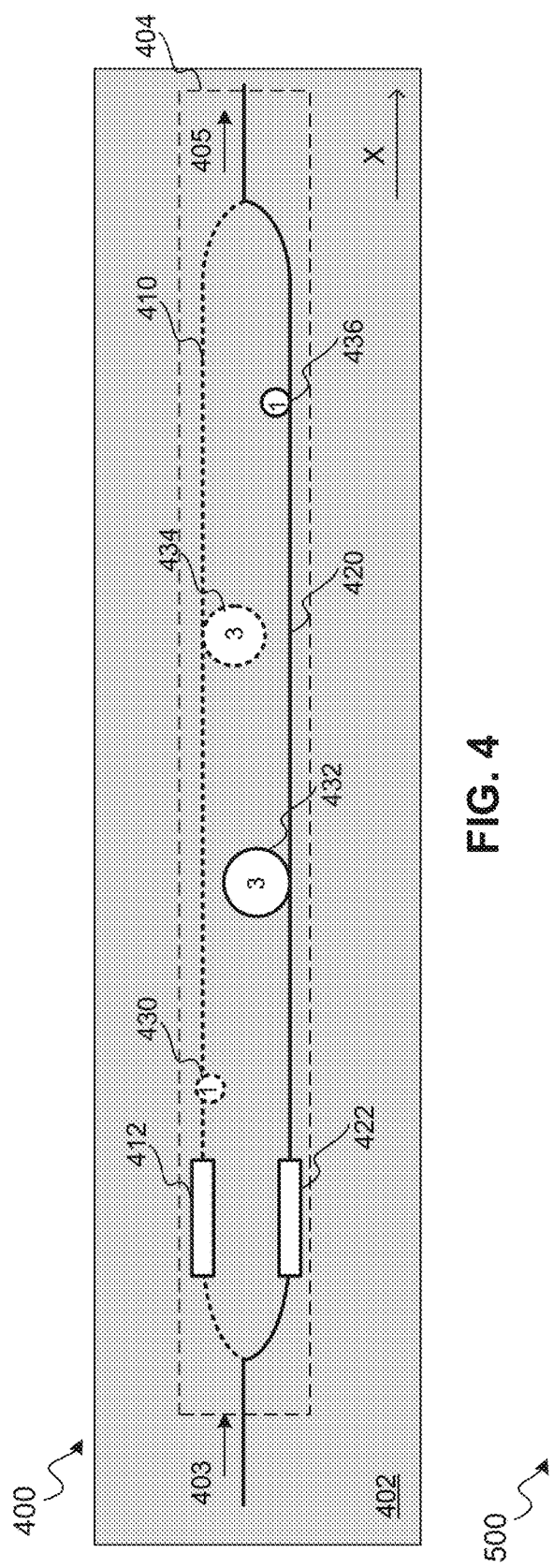
FIG. 4 is a conceptual diagram illustrating an example of a PIC-embedded all-optical nonlinear temperature-gradient measurement apparatus, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block-diagram form intending to avoid obscuring the concepts of the subject technology.

In one or more aspects, methods and configurations are described for providing an all-optical temperature-measurement system including one or more temperature sensors to be embedded at a location of interest within the photonic integrated circuit (PIC). The disclosed solution enables measuring temperature and/or temperature gradients inside the PIC. In some implementations, one or more interferometers can be employed to measure PIC internal temperature and/or temperature gradients. The interferometers can be essentially similar to or be improved versions of those commonly used for the wavelength measurement.

In one or more implementations, for absolute temperature measurement, an interferometer can be fabricated by using two waveguides made from different materials. In particular, the two waveguides need to have different values of (dn/dT), where n and T, respectively, represent the index of refraction of the waveguide and the temperature. The optical path distance (OPD) of the two interferometer arms are better to be equal at a given wavelength, although the method is not defeated if the input is tunable or uncertain. It can merely add to an error budget, which maps input wavelength uncertainty into temperature uncertainty. This uncertainty can be reduced either by using a frequency-stabilized source, or by measuring the input wavelength (as a wavemeter does). Having the OPDs being equal, also minimizes the influence of different laser frequencies on the measured phase, and so can be more useful than having unequal OPDs on the two arms.

In some implementations, for measurement of temperature gradient, an interferometer can be constructed out of two waveguides. The two waveguides can have nominally equal length, and with nonzero do/dT, but need to have extra (matching) lengths of waveguide, spiraled or in a serpentine shape. The spiral or serpentine portions can be positioned in different locations on the PIC.

In one or more implementations, higher-order temperature gradients can also be measured, for example, with three or more spirals on two arms with different lengths, with equal spacing, as will be discussed in more detail herein.

In some implementations, the optical waveguides with differing dn/dT values can be achieved by having different arms of the optical waveguide made of different core or cladding material, or by using the same nominal materials, but having different geometries and therefore exhibiting different thermal phase shifts. In one or more implementations, for absolute temperature measurement, an interferometer such as an asymmetric Mach-Zehnder interferometer (AMZI) is made with nominally equal optical path lengths, but comprising arms of different dn/dT. For temperature-gradient measurement, an interferometer is once again fabricated within the PIC, with equal-length arms, but, each with extra (equal) lengths of waveguides. The waveguide materials are chosen to have a nonzero dn/dT. These extra lengths, may, in the interest of physical compactness, for example, be arranged in the form of a compact spiral or in other shapes, as explained above. The spirals can be located at different regions of the PIC, for example, a first spiral on one arm of the interferometer located at one end of the chip, and a second matching spiral on the other arm located at the other end of the chip.

In one or more implementations, with no temperature gradient (but at any absolute temperature), the optical path length of the two arms can be equal, and if a fringe is electro-optically scanned out in the manner as given above, the fringe would exhibit at zero phase.

The existing solutions are based on use of external devices (e.g., thermistors, thermocouples), which cannot measure the internal temperature of the PIC. Use of power dissipating components on the PIC could generate large thermal gradients from one place to another on the PIC, resulting in readout errors made by externally mounted devices. Additionally, thermistors or other devices on the outside of the PIC, as small as they may be, are much bigger than the PIC-based structures described here, and their use by bonding to the exterior faces of what would have otherwise been flat chips may complicate packaging and mounting requirements.

FIG. 1A is a conceptual diagram illustrating an example of a PIC-embedded all-optical temperature-measurement apparatus 100 (hereinafter, apparatus 100), according to certain aspects of the disclosure. The apparatus 100 includes an optical interferometer 104 embedded in a PIC 102. The optical interferometer 104 includes a first arm 110, a second arm 120, a first phase modulator 112 and a second phase modulator 122. The first arm 110 and the second arm 120 are waveguides realized within the PIC 102. It is understood that the actual separation d between the first arm 110 and the second arm 120 is within the range of values of a width of the waveguides, but in the figures of this disclosure is shown much larger for clarity. In one or more implementations, the first phase modulators (112 and 122) are electro-optic phase modulators, made out of, for example, lithium niobate, but not limited to lithium niobate. In some implementations, the first phase modulators are thermo-optic phase modulators that can be made out of, for instance, silicon, but not limited to silicon. In other implementations, the first phase modulators can be other types of phase modulators. In some implementations, the first arm 110 and the second arm 120 can also be fabricated with embedded phase modulators in the waveguide itself (e.g., silicon).

The interferometer 104 further includes an optical waveguide section that is a long waveguide section (hereinafter, long section) 130 and provides a length extension to the waveguides of the first arm 110 and/or the second arm 120 in a compact form. For simplicity, the long section 130 is depicted as a circle. In reality, however, the long section 130 can be implemented in any shape that provides a compact length extension. In one or more implementations, the long section 130 can be implemented with one or more of curves, bends, folds or reflections to gain a longer OPL in a chip area than the longest dimension of the chip.

FIG. 1B is a conceptual diagram illustrating an example of a long section in a PIC embedded all-optical temperature-measurement apparatus, according to certain aspects of the disclosure. In some implementations, the long section 130 can be implemented as a rastered structure 130-1 to extend the length of waveguides of the first arm 110 and the second arm 120.

FIG. 1C is a conceptual diagram illustrating an example of a long section in a PIC embedded all-optical temperature-measurement apparatus, according to certain aspects of the disclosure. In some implementations, the long section 130 can be implemented as a spiral structure 130-2, having an input node 134 and an output node 136, to extend the length of each of the waveguides of the first arm 110 and the second arm 120. In the optical interferometer 104, the OPLs of the first arm 110 and the second arm 120 including the long section 130 are equal but the material of the first arm 110 and the second arm 120 are different, for example, having different do/dT.

FIG. 1D is a chart 150 illustrating example plots of transmission intensity fringes corresponding to a PIC embedded all-optical temperature-measurement apparatus, according to certain aspects of the disclosure. The chart 150 shows plots 152 and 154 illustrating transmission intensity fringes (hereinafter, fringes) that can be observed at an output port 105 of the interferometer 104. For any optical interferometer, with a given optical input signal (e.g., at an input port 103), a fringe can be mapped out by measuring an output signal, if the optical path length (OPL) difference between the two arms is swept over preferably at least $2\pi$ in phase, as shown by plots 152 and 154 of the chart 150. It is noted that the phase of this fringe (e.g., 152) is independent of wavelength if the OPL of the first arm 110 and the second arm 120 are perfectly matched.

It is understood, however, that at a different temperature, the differing dn/dT values of the first arm 110 and the second arm 120 can cause a phase shift between two beams of light traversing through the first arm 110 and the second arm 120. Accordingly, when a fringe (e.g., plot 154) is swept out by scanning the phase modulators 112 and 122, the fringe phase may be found to have shifted, for example, by $\Delta\phi_2$, with respect to the original fringe (e.g., plot 152) with an original phase shift Mi. The original phase shift $\Delta\phi_1$ is dependent on the original OPL difference of the arms that in the case of the first arm 110 and the second arm 120 is zero. The phase shift $\Delta\phi_2$ can be by an amount corresponding to the product of total OPL of the two arms (e.g., 110 and 120) at the in-use wavelength, the difference in dn/dT between the two arms, and the net temperature change experienced by the PIC 102 compared to the phase at a previous temperature (corresponding to fringe of plot 152). Therefore, measurement of the phase of this fringe amounts to a measurement of the absolute temperature of the PIC 102. However, it is noted that after a full $2\pi$ of fringe phase has been accumulated, the fringe phase will wrap back to where it was at the original temperature. This can result in a temperature ambiguity interval beyond which the temperature cannot be distinguished from certain other temperatures outside of this interval. It is noted that the rate of fringe phase shift with temperature can also be dependent on the wavelength at which the phase is measured, so accurate knowledge of the wavelength can lead to accurate measurement of the temperature.

In some implementations, the ambiguity problem can be mitigated by having multiple interferometers with different ambiguity intervals, especially including one interferometer with an ambiguity interval that exceeds the maximum possible temperature range that the PIC 102 could be experiencing. In other implementations, it is possible to have a thermistor which only measures the temperature outside of the PIC, but, accurately enough to resolve the ambiguity inherent in the optical fringe phase measurement. In yet another implementation, the measurement of wavelength may be altered so as to exhibit a different wavelength-and-temperature-dependent phase shift, resulting in a new constraint in the possible temperatures sufficient to resolve the ambiguity.

FIG. 2 is a conceptual diagram illustrating an example of a PIC-embedded all-optical linear temperature-gradient measurement apparatus 200 (hereinafter, apparatus 200), according to certain aspects of the disclosure. The apparatus 200 includes an optical interferometer 204 embedded in a PIC 202. The optical interferometer 204 includes a first arm 210, a second arm 220, a first phase modulator 212 and a second phase modulator 222. The first arm 210 and the second arm 220 are waveguides realized within the PIC 202. The first phase modulator 212 and a second phase modulator 222 are similar to the first phase modulator 112 and a second phase modulator 122 of FIG. 1A, described above. The interferometer 204 further includes long sections 230 and 232 realized at different locations on the first arm 210 and second arm 220. The long section 230 is made with the waveguide of the first arm 210, and the long section 232 is made with the waveguide of the second arm 220. For simplicity, the long sections 230 and 232 are depicted as circles. In reality, however, the long sections 230 and 232 can be implemented in any shape that provides a compact length extension, for example, a spiral shape.

In the optical interferometer 204, the OPLs of the first arm 210 and the second arm 220, including the respective long sections 230 and 232, can be equal or unequal and the material of the first arm 210 and the second arm 220 can be the same or different, for example, having the same or different dn/dT. In one or more implementations, when there is a component of temperature gradient along the PIC 202 in the direction X, the long sections 230 and 232 can experience different temperatures, and then, through the nonzero dn/dT values of their materials they can exhibit different optical insertion phases. This may result in a fringe phase shift which can be measured, as explained above with respect to FIG. 1D. The phase shift can be proportional to the dn/dT value of the material of the long sections 230 and 232 (e.g., spirals), the OPL of the spirals, the temperature gradient imposed on the PIC 202, and distance D between the spirals. Due to difference in location in the direction X of the long sections 230 and 232, the optical interferometer 204 is sensitive to a gradient of temperature in the direction X.

It is noted that simultaneous measurement of the gradient in different (e.g., perpendicular) directions can require the use of multiple interferometers. In some implementations, three long sections could be used in a triangular arrangement to measure gradients in two perpendicular directions, and four long sections in a tetrahedral arrangement could be used to measure the gradients in three perpendicular directions.

As in the case with the absolute measurement of FIG. 1A, once again, there can be an ambiguity interval given by the amount of gradient necessary to drive the optical path length different by $2\pi$ at the wavelength of use. In a similar manner, this ambiguity could be resolved by use of a different interferometer with a larger ambiguity interval, made, for example, with shorter long sections or with smaller distance (D) between the long sections, such that the resulting ambiguity interval is larger than any possible gradient that the PIC 202 would ever be subjected to.

FIG. 3 is a conceptual diagram illustrating an example of a PIC-embedded all-optical nonlinear temperature-gradient measurement apparatus 300 (hereinafter, apparatus 300), according to certain aspects of the disclosure. The apparatus 300 includes an optical interferometer 304 embedded in a PIC 302. The optical interferometer 304 includes a first arm 310, a second arm 320, a first phase modulator 312 and a second phase modulator 322. The first arm 310 and the second arm 320 are waveguides realized within the PIC 302. The first phase modulator 312 and a second phase modulator 322 are similar to the first phase modulator 112 and a second phase modulator 122 of FIG. 1A, described above. The interferometer 304 further includes long sections 330, 332 and 334 realized at different locations on the first arm 310 and second arm 320. The long sections 330 and 334 are made with the waveguide of the first arm 310, and the long section 332 is made with the waveguide of the second arm 320. For simplicity, the long sections 330, 332 and 334 are depicted as circles. In reality, however, the long sections 330, 332 and 334 can be implemented in any shape that provides a compact length extension, for example, a spiral shape. The differences in OPL of the circles representing the long sections 330, 332 and 334 are noted by numbers 1, 2 and 1 shown inside the circles. In other words, the lengths of the long sections 330, 332 and 334 are terms of a third row (1, 2, 1) of a binomial triangle, also known as Pascal's triangle. The centers of the long sections 330, 332 and 334 are equally spaced on the optical interferometer 304.

Because the total lengths of waveguides of the first arm 310 and the second arm 320 including the long sections 330, 332 and 334 are equal, the optical interferometer 304 will be insensitive to temperature. Because the long section 332 is exactly halfway between the long sections 330 and 334, the optical interferometer 304 is insensitive to linear temperature gradient. This is because in the presence of such a gradient, the amount that the long section 334 is hotter than the long section 332 is the same as the amount that the long section 330 is cooler than the long section 332, because it is equally far away on the other side. Assuming that dn/dT is perfectly constant, the cancellation is perfect. Even with a slightly nonlinear dn/dT, although the cancellation will not be perfect, it may nevertheless be good enough. It is understood that the optical interferometer 304 is insensitive to gradients perpendicular to the displacement vector X because, in that case, all the spirals would be at the same average temperature. The optical interferometer 304 is insensitive to both absolute temperature and to linear temperature gradient.

The optical interferometer 304 is, however, sensitive to nonlinear (e.g., parabolic) temperature gradients in the direction of displacement vector X. Using the long section 332 as the origin, and, without loss of generality, assuming a zero linear temperature gradient, both the long sections 330 and the long sections 334, will either be hotter than or cooler than the long sections 332 (depending on the sign of the parabolic gradient), and, therefore both of them accrue either more or less OPL than the long sections 332 (depending on both the sign of the quadratic gradient and the sign of the dn/dT of the waveguide material).

FIG. 4 is a conceptual diagram illustrating an example of a PIC-embedded all-optical nonlinear temperature-gradient measurement apparatus 400 (hereinafter, apparatus 400), according to certain aspects of the disclosure. The apparatus 400 includes an optical interferometer 404 embedded in a PIC 402. The optical interferometer 404 includes a first arm 410, a second arm 420, a first phase modulator 412 and a second phase modulator 422. The first arm 410 and the second arm 420 are waveguides realized within the PIC 402. The first phase modulator 412 and a second phase modulator 412 are similar to the first phase modulator 112 and a second phase modulator 122 of FIG. 1A, described above. The interferometer 404 further includes long sections 430, 432, 434 and 436 realized at different locations on the first arm 410 and second arm 420. The long sections 430 and 334 are made with the waveguide of the first arm 410, and the long sections 432 and 436 are made with the waveguide of the second arm 420. For simplicity, the long sections 430, 432, 434 and 436 are depicted as circles. In reality, however, the long sections 430, 432, 434 and 436 can be implemented in any shape that provides a compact length extension, for example, a spiral shape. The difference in OPL of the circles representing the long sections 430, 432, 434 and 436 are noted by numbers 1, 3, 3 and 1 shown inside the circles. In other words, the lengths of the long sections 430, 432, 434 and 436 are terms of a fourth row (1, 3, 3, 1) of Pascal's triangle. The centers of the long sections 430, 432, 434 and 436 are equally spaced on the optical interferometer 404. Because the total OPLs of the arms 410 and 420 are equal, the entire interferometer 404 is insensitive to uniform temperature.

Further, because the spacing between the long sections 430, 432, 434 and 436 is equal, the interferometer 404 is also insensitive to linear temperature gradient along the direction of the displacement vector X (as well as perpendicular to it). This is because, for the linear temperature gradient along the direction of the displacement vector X, the resulting OPL changes of the long sections 430 and 434 can cancel out with those of the long sections 432 and 436, thus the final result is that this interferometer is insensitive to linear gradient.

The insensitivity to linear gradient of the 1:3:3:1 interferometer 404 can be demonstrated in a more mathematical way. Setting the origin of both the temperature and displacement in the center of the structure, the long sections 430, 432, 434 and 436 are at X locations of −3, −1, +1, and +3. A linear temperature gradient along the displacement vector X will also register, because it is linear, as proportional to distance away from center. So the temperature excursions (i.e., ΔT) experienced by the four long sections will be, for example and without loss of generality, −3, −1, +1, and +3 degrees. But the lengths are 1:3:3:1, so the relative OPL changes for each long section will be OPL×ΔT for each long section. The resulting OPL-ΔT products are then 1×−3; 3×−1; 3×1; 1×3, which gives the list −3:−3:3:3. The first arm 410 contains the first and third elements (−3 and 3) of this list, and the second arm 410 contains the second and last elements (−3 and 3) of this list. So, the total OPL change for both arms is zero (3+−3=0), resulting in no difference in OPLs, and therefore optical phase when the interferometer 404 is exposed to a linear temperature gradient. It can readily be shown that for a quadratic temperature gradient for which the temperature (T) changes versus x as $x^2$, the OPL changes of the two arms (410 and 420) will again cancel out, indicating that the interferometer 404 is insensitive to the quadratic temperature gradient. However, following similar mathematical steps, it can be shown that the interferometer 404 will be sensitive to a cubic temperature gradient along the spiral displacement vector X. In other words, if the OPL of the long section are terms of the fourth ($4^{th}$) row of Pascal's triangle, the interferometer will be insensitive to nonlinearity in temperature gradient up to the third ($3^{rd}$) order.

Figure 5:
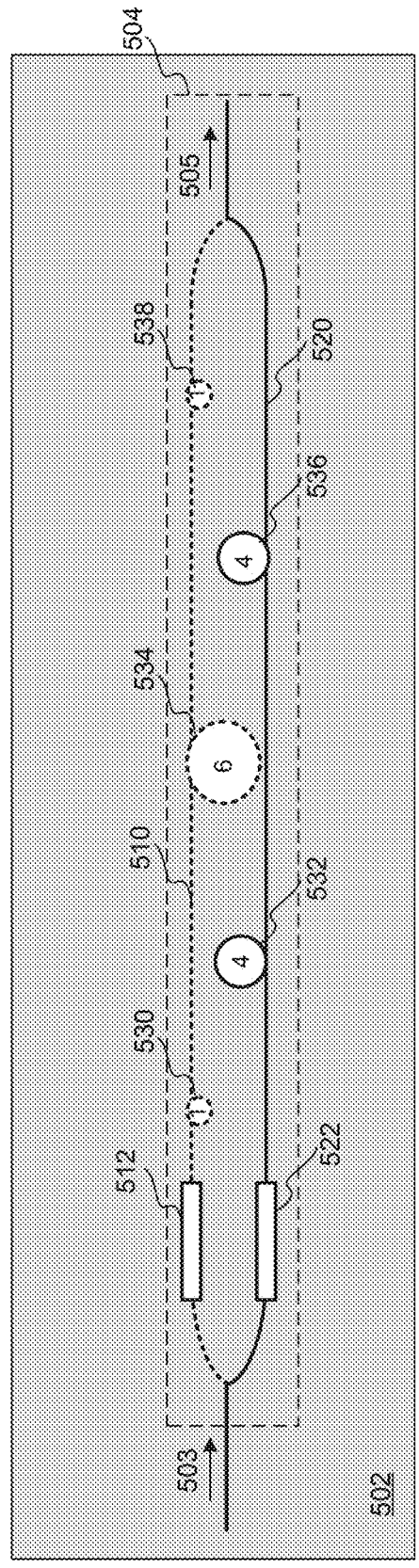
FIG. 5 is a conceptual diagram illustrating an example of a PIC-embedded all-optical nonlinear temperature-gradient measurement apparatus, according to certain aspects of the disclosure.

FIG. 5 is a conceptual diagram illustrating an example of a PIC-embedded all-optical nonlinear temperature-gradient measurement apparatus 500 (hereinafter, apparatus 500), according to certain aspects of the disclosure. The apparatus 500 includes an optical interferometer 504 embedded in a PIC 502. The optical interferometer 504 includes a first arm 510, a second arm 520, a first phase modulator 512 and a second phase modulator 522. The first arm 510 and the second arm 520 are waveguides realized within the PIC 502. The first phase modulator 512 and a second phase modulator 512 are similar to the first phase modulator 112 and a second phase modulator 122 of FIG. 1A, described above. The interferometer 504 further includes long sections 530, 532, 534, 536 and 538 realized at different locations on the first arm 510 and second arm 520. The long sections 530, 534 and 538 are made with the waveguide of the first arm 510, and the long sections 532 and 536 are made with the waveguide of the second arm 520. For simplicity, the long sections 530, 532, 534, 536 and 538 are depicted as circles. In reality, however, the long sections 530, 532, 534, 536 and 538 can be implemented in any shape that provides a compact length extension, for example, a spiral shape. The differences in OPLs of the circles representing the long sections 530, 532, 534, 536 and 538 are noted by numbers 1, 4, 6, 4 and 1 shown inside the circles. In other words, the lengths of the long sections 530, 532, 534, 536 and 538 are terms of a fifth ($5^{th}$) row (1, 4, 6, 4, 1) of Pascal's triangle. The centers of the long sections 530, 532, 534, 536 and 538 are equally spaced on the optical interferometer 504.

Because the total OPLs of the two arms (510 and 520) are again equal (because 1+6+1=4+4=8), there will be no sensitivity to uniform temperature, as both arms will equally lengthen or shrink with changing uniform temperature. Following similar mathematical steps described above with respect to insensitivity of the interferometer 404 to nonlinearities in temperature gradient up to the third ($3^{rd}$) order, it can be shown that the interferometer 504 is similarly insensitive to nonlinearities in temperature gradient up to the fourth ($4^{rd}$) order.

It should be obvious to anyone skilled in the art to understand that various rows of Pascal's triangle can be used to generate interferometers that are ideally insensitive to all orders of thermal gradient up to a given order, which depends on the row number in question. Additionally, it can be stated that other optical interferometer arrangements can also be contrived with similar properties, and that Pascal's triangle merely serves as an example rather than a limitation.

Figure 6:
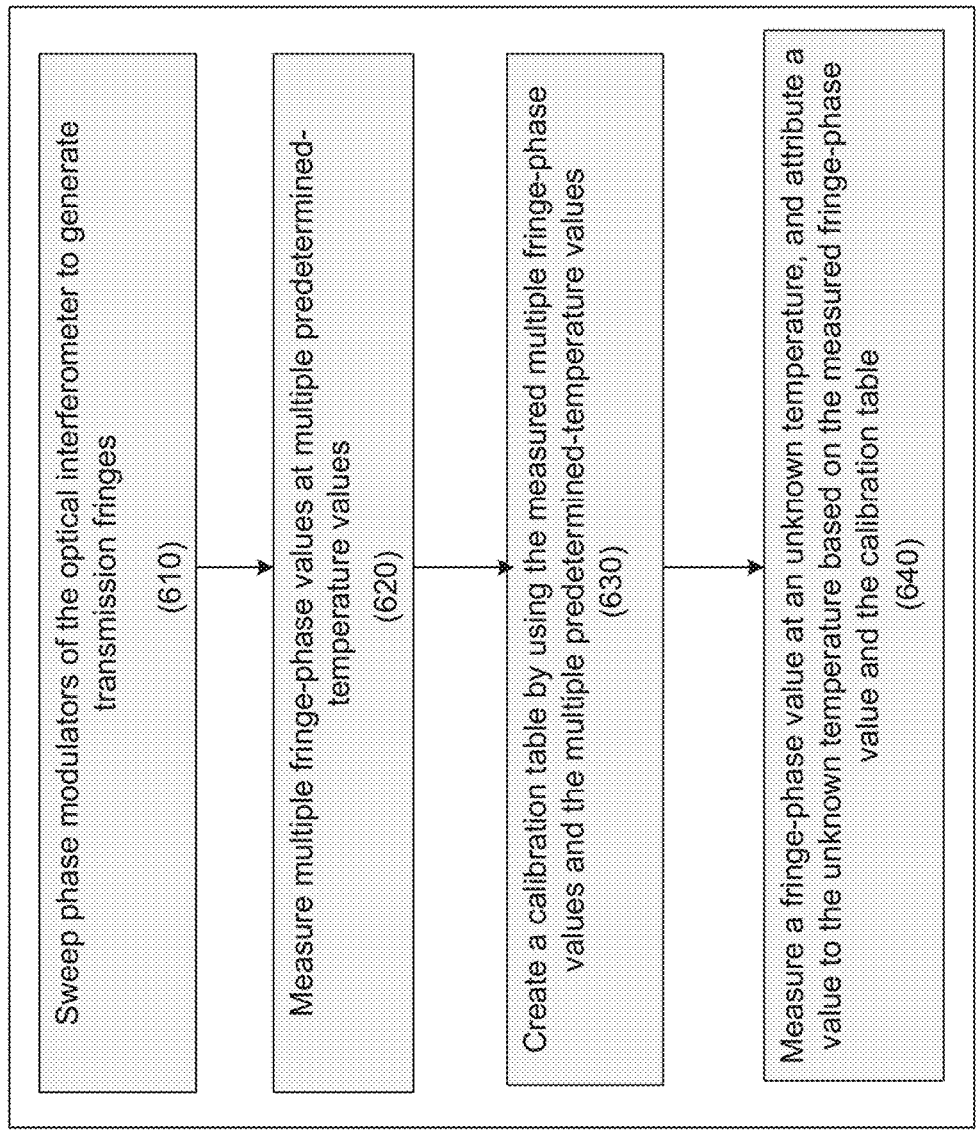
FIG. 6 is a flow diagram illustrating an example method of measuring temperature of a PIC using an optical interferometer, according to certain aspects of the disclosure.

FIG. 6 is a flow diagram illustrating an example method 600 of measuring temperature of a PIC (e.g., 102 of FIG. 1A) using an optical interferometer (e.g., 104 of FIG. 1A), according to certain aspects of the disclosure. The method 600 includes sweeping phase modulators (e.g., 112 and 122 of FIG. 1A) of the optical interferometer to generate transmission fringes (e.g., 152 and 154 of FIG. 1D) (610). The method 600 further includes measuring multiple fringe-phase values (e.g., $\Delta\phi_1$ of FIG. 1D) at multiple predetermined-temperature values (620). A calibration record is created by using the measured multiple fringe-phase values and the multiple predetermined-temperature values (630). A fringe-phase value is measured at an unspecified temperature, and a value is attributed to the unspecified temperature based on the measured fringe-phase value and the calibration record (640).

Figure 7:
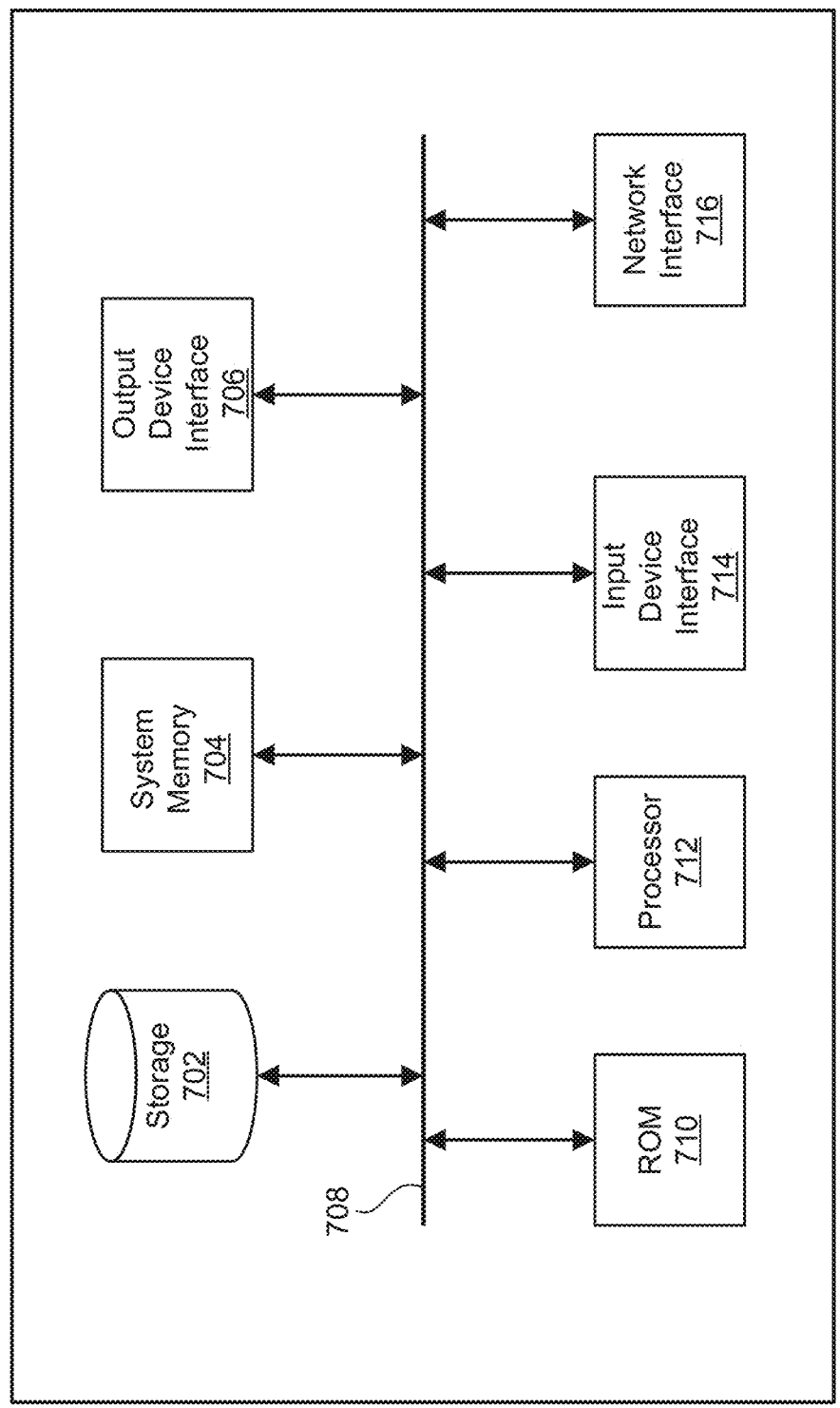
FIG. 7 conceptually illustrates an electronic system with which any implementations of the subject technology are implemented.

FIG. 7 conceptually illustrates an electronic system with which any implementations of the subject technology are implemented. Electronic system 700, for example, can be a desktop computer, a laptop computer, a tablet computer, a server, or any device that can perform computations. Electronic system 700 includes bus 708, processing unit(s) 712, system memory 704, read-only memory (ROM) 710, permanent storage device 702, input device interface 714, output device interface 706, and network interface 716, or subsets and variations thereof.

Bus 708 collectively represents all system, peripheral, and chipset buses that communicatively connect the numerous internal devices of electronic system 700. In one or more implementations, bus 708 communicatively connects processing unit(s) 712 with ROM 710, system memory 704, and permanent storage device 702. From these various memory units, processing unit(s) 712 retrieves instructions to execute and data to process in order to execute the processes of the subject disclosure. The processing unit(s) can be a single processor or a multicore processor in different implementations.

ROM 710 stores static data and instructions that are needed by processing unit(s) 712 and other modules of the electronic system. Permanent storage device 702, on the other hand, is a read-and-write memory device. This device is a nonvolatile memory unit that stores instructions and data even when electronic system 700 is off. One or more implementations of the subject disclosure use a mass-storage device (such as a magnetic or optical disk and its corresponding disk drive) as permanent storage device 702.

Other implementations use a removable storage device (such as a floppy disk, a flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores any of the instructions and data that processing unit(s) 712 needs at runtime. In one or more implementations, the processes of the subject disclosure are stored in system memory 704, permanent storage device 702, and/or ROM 710. From these various memory units, processing unit(s) 712 retrieves instructions to execute and data to process in order to execute the processes of one or more implementations.

Bus 708 also connects to input and output device interfaces 714 and 706. Input device interface 714 enables a user to communicate information and select commands to the electronic system. Input devices used with input device interface 714 include, for example, alphanumeric keyboards and pointing devices (also called "cursor control devices"). Output device interface 706 enables, for example, the display of images generated by electronic system 700. Output devices used with output device interface 706 include, for example, printers and display devices such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback such as visual feedback, auditory feedback, or tactile feedback; and input from the user can be received in any form including acoustic, speech, or tactile input.

Finally, as shown in FIG. 7, bus 708 also couples electronic system 700 to a network (not shown) through network interface 716. In this manner, the computer can be a part of a network of computers (such as a local area network ("LAN"), a wide area network ("WAN"), or an Intranet, or a network of networks such as the Internet. Any or all components of electronic system 700 can be used in conjunction with the subject disclosure.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW), flash memory (e.g., SD cards, mini-SD cards, micro-SD cards, etc.), magnetic and/or solid state hard drives, ultra-density optical discs, any other optical or magnetic media, and floppy disks. In one or more implementations, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In one or more implementations, the computer-readable media is nontransitory computer-readable media, computer readable storage media, or nontransitory computer readable storage media.

In some implementations, a simplified version of the electronic system 700 (for example, excluding the output device interface 706, input device interface 714 and network interface 716) can be implemented on an integrated circuit (IC). The IC can then be integrated with the PIC, on which the temperature-measurement apparatus of the subject technology in implemented.

In some aspects, the subject technology is related to photonic integrated circuits, and, more particularly, to all-optical temperature and temperature-gradient measurement in photonic integrated circuits. In some aspects, the subject technology may be used in various markets, including, for example and without limitation, telecom, control systems, quantum information and sensor technology exploitation markets.

Those of skill in the art would appreciate that the various illustrative blocks, modules, elements, components, methods, and algorithms described herein may be implemented as electronic hardware, computer software, or a combination of both. To illustrate this interchangeability of hardware and software, various illustrative blocks, modules, elements, components, methods, and algorithms have been described above generally in terms of their functionalities. Whether such a functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended on the details of construction or design herein shown, other than as described in the claims below. It is therefore evident that the particular illustrative aspects disclosed above may be altered, combined, or modified, and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. A photonic integrated circuit (PIC) with embedded optical temperature sensing, the PIC comprising:
    an optical interferometer including a first arm and a second arm including a first phase modulator (PM) implemented on the first arm and a second PM implemented on the second arm to change optical phase difference (Df) between the first arm and the second arm; and
    one or more optical waveguide sections comprising one or more long waveguide sections configured to enable optical temperature sensing within the PIC,
    wherein:
    the one or more optical waveguide sections are implemented on the first arm and the second arm,
    a first long-waveguide section and a second long-waveguide section are implemented separately on two ends of the first arm and a third long waveguide section is implemented on the second arm to enable a nonlinear temperature-gradient measurement, and
    the first arm and the second arm have a first optical path length (OPL) and a second OPL and are made of a first material and a second material, respectively.

2. The PIC of claim 1, wherein a wavelength of an input signal of the optical interferometer is a predetermined wavelength, the first OPL is equal to the second OPL, and the first material and the second material have nonidentical temperature coefficients of an index of refraction (dn/DT).

3. The PIC of claim 1, wherein at least one of the one or more long waveguide sections comprises an optical waveguide section implemented with one or more of curves, bends, folds or reflections to gain a longer OPL in a chip area than a longest dimension of said chip area, and wherein the at least one of the one or more long waveguide sections is implemented at a desired position on the PIC.

4. The PIC of claim 3, wherein the one or more long waveguide sections are implemented separately on the first arm and the second arm and at different locations.

5. The PIC of claim 4, wherein the one or more long waveguide sections are implemented at a first position and a second position on the PIC, and wherein the one or more long waveguide sections are configured to enable a nonlinear temperature-gradient measurement between the first and the second position.

6. The PIC of claim 5, wherein at least one of the one or more long-waveguide sections comprises an optical waveguide section implemented with one or more of curves, bends, folds or reflections to gain a longer OPL in a chip area than a longest dimension of said chip area.

7. The PIC of claim 1, wherein the first OPL and the second OPL are equal and the first material and the second material have identical do/dT to enable insensitivity to an average temperature and a linear temperature gradient.

8. The PIC of claim 1, wherein the first long waveguide section, the second long waveguide section, and the third long waveguide section are implemented in a noncolinear arrangement to enable measurement of temperature gradients in two perpendicular directions, and wherein the noncolinear arrangement includes a triangular arrangement.

9. The PIC of claim 1, wherein at least one of the long-waveguide sections comprises an optical waveguide section implemented as one of a rastered-waveguide section or a spiral-waveguide section.

10. The PIC of claim 9, wherein the one or more long waveguide sections have respective lengths defined by terms of a row of Pascals's triangle and are implemented with an equal distance alternately on the first arm and the second arm, and wherein the one or more long waveguide sections are configured to enable insensitivity to different orders of a thermal gradient up to a given order.

11. The PIC of claim 1, wherein the one or more long waveguide sections are implemented in a nonplanar arrangement to enable measurement of temperature gradients in three perpendicular directions, and wherein the nonplanar arrangement includes a tetrahedral arrangement.

12. An interferometric temperature-measurement apparatus, the apparatus comprising:
    an optical interferometer including a first arm and a second arm implemented on a photonic integrated circuit (PIC);
    one or more phase modulators (PMs) on the first arm and one or more PMs implemented on the second arm, and configured to change optical phase difference (Df) between the first arm and the second arm; and
    one or more optical waveguide sections comprising one or more long waveguide sections implemented on the optical interferometer,
    wherein:
    the first arm and the second arm have a first optical path length (OPL) and a second OPL and are made of a first material and a second material, respectively, and
    a first long-waveguide section and a second long-waveguide section are implemented separately on two ends of the first arm and a third long waveguide section is implemented on the second arm to enable a nonlinear temperature-gradient measurement.

13. The apparatus of claim 12, wherein the first PM and the second PM are configured to facilitate sweeping transmission fringes to enable calibrating the apparatus at known temperatures for a known wavelength.

14. The apparatus of claim 12, wherein the first OPL is equal to the second OPL, and the first material and the second material have nonidentical temperature coefficients of an index of refraction (dn/dT).

15. The apparatus of claim 14, wherein the one or more long waveguide sections comprises one or more of curves, bends, folds or reflections to gain a longer OPL in a chip area than a longest dimension of said chip.

16. The apparatus of claim 14, wherein the one or more long waveguide sections comprise a single spiral-waveguide section implemented at a desired position on the PIC.

17. The apparatus of claim 12, wherein the one or more long waveguide sections comprise two spiral-waveguide sections that are implemented separately on the first arm and the second arm and at different locations to enable a temperature-gradient measurement.

18. A method of measuring temperature of a photonic integrated circuit (PIC) using an optical interferometer, the method comprising:
- sweeping a first phase modulator (PM) implemented on a first arm and a second PM implemented on a second arm of the optical interferometer to generate transmission fringes;
- measuring multiple fringe-phase values at multiple known-temperature values;
- creating a calibration record using the measured multiple fringe-phase values and the multiple known-temperature values;
- measuring a fringe-phase value at an unspecified temperature; and
- attributing a value to the unspecified temperature based on the measured fringe-phase value and the calibration record, wherein:
- the optical interferometer includes one or more optical waveguide sections comprising one or more long waveguide sections, and
- a first long-waveguide section and a second long-waveguide section are implemented separately on two ends of the first arm and a third long waveguide section is implemented on the second arm to enable a nonlinear temperature-gradient measurement.

19. The method of claim 18, wherein the optical interferometer is implemented in the PIC, and wherein the one or more long sections comprise one or more of curves, bends, folds or reflections to gain a longer OPL in a chip area than a longest dimension of said chip.

20. The method of claim 18, wherein a wavelength of an input light of the optical interferometer is unspecified, and wherein the method further comprises measuring a wavelength of an input light of the optical interferometer by using an asymmetric Mach-Zehnder interferometer (MZI) implemented in the PIC.

* * * * *